Patented Oct. 11, 1949

2,484,108

UNITED STATES PATENT OFFICE 2,484,108

HIGH CLARITY CELLULOSE ESTERS

Mervin E. Martin, Laurence G. Reed, and James L. Thomas, Cumberland, Md., assignors to Celanese Corporation of America, a corporation of Delaware No Drawing. Application January 17, 1946, Serial No. 641,868

1 Claim. (Cl. 260—230)

This invention relates to the preparation of organic acid esters of cellulose and relates more particularly to the production of cellulose acetate or other organic acid esters of cellulose which yield molded products of high clarity and low developed color.

An object of this invention is the provision of an improved process for the separation of organic acid esters of cellulose into fractions of different constitution and molecular weights by fractional precipitation operations.

Another object of this invention is to provide a process for the fractionation of cellulose acetate whereby those fractions yielding molded products of an unusual degree of clarity and low developed color may be separated from fractions which develop color and fractions which contain haze-producing components.

Other objects of this invention will appear from the following detailed description.

While our invention will be more particularly described in connection with the preparation of cellulose acetate of improved molding properties, it is to be understood, of course, that our novel process may be employed with equally valuable results in the preparation of other organic acid esters of cellulose of improved molding properties. Examples of other organic acid esters of cellulose which may be prepared in accordance with the novel fractionation process of our invention are cellulose propionate and cellulose butyrate as well as mixed esters, such as cellulose acetate-propionate and cellulose acetate-butyrate.

Cellulose acetate and other thermoplastic organic acid esters of cellulose are extensively employed, for example, in the production of a wide variety of industrially valuable molded products. When suitably compounded with plasticizers, pigments, effect materials, and other modifying agents, the organic acid esters of cellulose may be subjected to molding operations under heat and pressure and molded articles of wide utility may be obtained. To be entirely satisfactory for the widest application, cellulose acetate which is to be subjected to molding operations must possess several important characteristics. For example, the cellulose acetate must yield clear, transparent and haze-free articles which are tough without being brittle, and also little or no color should develop during molding to shift the coloration from a clear, limpid, water-white color to a yellowish, or brownish tint. Another important factor in the production of satisfactory molding articles is the degree of stability of the cellulose acetate employed. The stability should be such that the cellulose acetate may be molded without suffering any substantial molecular degradation and consequent viscosity loss.

The process employed for esterifying the cellulose has an important bearing on the properties of the cellulose acetate produced. The various properties such as, for example, clarity, viscosity, stability and acyl value, as well as other particular properties or characteristics, may be kept to fairly close standards by conducting the esterification of the cellulose, and the ripening of the cellulose esters produced, in accordance with procedures designed to yield cellulose esters of particular physical characteristics. Regardless of the methods employed, for example, for the acetylation of cellulose and for the ripening of the cellulose acetate obtained, the latter is usually a heterogeneous composition composed of cellulose acetates of varying molecular weights. This is due to the fact that some degradation of the cellulose molecule takes place not only during the preparation of the cellulose employed for the acylation but also during esterification process itself. Since such degradation results in the formation of cellulose molecules of varying chain lengths, the resulting cellulose acetate will be composed of fractions which vary in molecular weight. Some of the lower molecular weight fractions are quite unstable and decompose under heat. Attempts at controlling or eliminating those unstable bodies which tend to impart an undesirable degree of color to molded cellulose acetate materials by modifying the esterification and/or ripening procedures have not yielded entirely satisfactory results. While the exact nature and/or origin of all of the color-forming bodies is not fully known, it is essential that these bodies be removed or their effects minimized if the cellulose esters obtained are to be entirely satisfactory for molding operations.

We have now found that color and haze-forming bodies may be removed from cellulose acetate to yield cellulose acetate of excellent color characteristics yielding molded products of extremely high clarity and low developed-color. This is effected by subjecting cellulose acetate, in acetone solution, to fractional precipitation, in a particular manner, employing ethyl alcohol as the precipitant. The fractionation of the cellulose acetate, in accordance with our novel process, effects the removal of undesirable color or haze-forming components in one or another of the fractions obtained, with the result that the major cellulose acetate fraction is substantially homogeneous and, upon being molded at elevated temperature and pressure, may be formed into molded articles of unsurpassed clarity and color.

Usually, a desirable degree of purification of the cellulose acetate may be effected by separating the cellulose acetate into three or more separate fractions. The initial fraction normally contains the major portion of the color and haze-forming bodies while the last fraction generally contains the greater portion of the low molecular weight cellulose acetate which forms when the more degraded portions of the cellulose are acetylated. The middle fraction is retained and yields those superior molded products heretofore mentioned.

To fractionate the cellulose acetate in accordance with our novel process, the cellulose acetate is first dissolved in a sufficient quantity of acetone to form a 5 to 20% solution by weight and ethyl alcohol is then added thereto with agitation until the solution becomes milky and a cellulose acetate precipitate forms. Both the cellulose acetate solution and the alcohol added thereto are maintained at a temperature of 20 to 25° C. during the addition. After there is an indication that the cellulose acetate precipitate is going to settle, both the precipitate and the supernatant liquid are then heated to a temperature of 35 to 45° C. whereupon the precipitate is redissolved so that a solution of cellulose acetate is obtained. To precipitate the first fraction from the heated cellulose acetate solution, the latter is cooled slowly until it becomes cloudy, indicating the formation of a precipitate. The temperature to which the cellulose acetate solution is cooled determines the amount of cellulose acetate removed as the first fraction. The lower the temperature to which the solution is cooled the larger is the amount of cellulose acetate precipitated, and removed. Preferably, the solution is cooled to about 30 to 40° C. so that the initial fraction taken out amounts to about 10 to 20% by weight of the total cellulose acetate present. The supernatant liquid is decanted from the precipitate and the precipitated fraction is then removed.

The valuable middle fraction of cellulose acetate is separated from the cellulose acetate still dissolved in the supernatant liquid by heating the latter under a vacuum to a temperature of 60 to 67° C., heating being continued until the liquid volume has been reduced sufficiently to cause the incipient precipitation of cellulose acetate. The vacuum is removed and an additional quantity of ethyl alcohol is then added with agitation, a sufficient amount of alcohol being added so that from 70 to 80% of the cellulose acetate initially employed is precipitated as the second fraction. The precipitate is allowed to settle completely and the supernatant liquid removed. The cellulose acetate remaining in solution comprises the third fraction and may be employed alone or in combination with the first fraction for the production of cellulose acetate materials such as yarns, and the like, where a very high order of clarity or color is not essential. The middle cellulose acetate fraction is dried and may then be employed in molding operations in the manner well known to the art.

In order further to illustrate our invention but without being limited thereto, the following examples are given:

Example I 75 parts by weight of cellulose acetate of an acetyl value of 53.5%, calculated as acetic acid are dissolved in 425 parts by weight of acetone at 22° C. to make a 15% solution. About 720 parts by weight of ethyl alcohol are added to the solution, with stirring, and a portion of the cellulose acetate in solution is precipitated therefrom. The solution containing the precipitate is heated to 40° C. in order to dissolve the precipitate. Upon cooling the solution to 36° C. and maintaining this temperature for 15 hours the desired precipitation and fractionation takes place. A first fraction, comprising 16 parts by weight of cellulose acetate, or 21.3% of the total originally present, is precipitated. The supernatant liquid is then decanted from the precipitate and heated to 60° C. under vacuum. The volume of the solution gradually decreases, the solvent vapors coming off being recovered in a suitable solvent recovery system. When the cellulose acetate in solution begins to precipitate the vacuum is broken. The temperature is then raised to 67° C. and 900 parts by weight of ethyl alcohol are added with stirring to effect the precipitation of the second fraction. The mixture obtained is stirred for thirty minutes at a temperature of 67° C. and then allowed to settle for an additional thirty minutes before the supernatant liquid is decanted and the precipitated cellulose acetate fraction, comprising 69.6 parts by weight removed. The cellulose acetate fraction is re-dissolved in 240 parts by weight of acetone, 30 parts by weight of diethyl phthalate added thereto, and, after concentrating the solution to a thick dope under vacuum, the cellulose acetate is cast into films. The films, after being preformed in a cold mold under high pressure, are then molded into disc form at 200° C. for 15 minutes under a pressure of 1500 pounds per square inch. The disc obtained is of an unusual degree of clarity, 90.2% of the light at 640 m$\mu$ and 79.6% of the light at 440 m$\mu$ being transmitted. The disc has a yellowness coefficient of 0.12.

The numerical expression of color development, i. e. the yellowness coefficient, is obtained by determining the light transmission of the sample in question at a wave length of 640 m$\mu$ minus that at a wave length of 440 m$\mu$ divided by the light transmission at 640 m$\mu$. The greater this coefficient the greater the degree of color.

Example II 75 parts by weight of cellulose acetate of an acetyl value of 53.5%, calculated as acetic acid, are dissolved in 425 parts by weight of acetone at 24° C. To the solution obtained there is then added about 570 parts by weight of ethyl alcohol, the solution being stirred during the alcohol addition. A precipitate of cellulose acetate is formed and the solution is then heated to 37° C. to dissolve the precipitate. The temperature is lowered to 30° C. and held at this temperature for 16 hours to precipitate a first fraction amounting to 9 parts by weight of cellulose acetate or 12% of the cellulose acetate originally present in solution. The supernatant liquid is decanted from the precipitate and heated at 67° C. under vacuum until precipitation of the second cellulose acetate fraction commences. The vacuum is broken and about 420 parts by weight of ethyl alcohol added with stirring to precipitate the second cellulose acetate fraction. The second fractional precipitate comprises 55.0 parts by weight, or 73.3% of the cellulose acetate originally present in the initial acetone solution. The supernatant liquid and the precipitate are stirred for thirty minutes at a temperature of 67° C., the precipitate allowed to settle for thirty minutes and the supernatant liquid then decanted from the precipitate. The latter is dissolved in 240 parts by weight of acetone, 30 parts by weight of diethyl phthalate are added thereto and the volume reduced by evaporating the acetone therefrom until a thick dope is obtained. The dope is cast to form cellulose acetate films, the acetone evaporated therefrom and, after preforming, the films are molded into discs at 200° C. for 15 minutes under a pressure of 1500 pounds per square inch. The molded discs obtained have a yellowness coefficient of 0.08 with 82.4% of light at a wave length of 440 m$\mu$ and 90.4% of light at a wave length of 640 m$\mu$ being transmitted.

It is to be understood that the foregoing detailed description is given merely by way of illustration and that many variations may be made therein without departing from the spirit of our invention.

Having described our invention, what we desire to secure by Letters Patent is:

Process for the fractionation of cellulose acetate whereby color and haze-forming components are removed therefrom, which comprises dissolving cellulose acetate in acetone to form a 5 to 20% solution by weight, adding ethyl alcohol to said solution while both the solution and the ethyl alcohol added thereto are at a temperature of 20 to 25° C. until a precipitate of cellulose acetate forms, heating the solution to a temperature of 35 to 45° C. to re-dissolve the precipitate, cooling the heated solution to a temperature of 30 to 40° C., maintaining the mixture at said temperature for 10 to 20 hours to effect precipitation of a fraction of the cellulose acetate in solution amounting to 10 to 20% of the original cellulose acetate present therein, removing said fraction, evaporating the solvent from the remaining cellulose acetate solution until a precipitate starts to form, adding an additional quantity of ethyl alcohol thereto at a temperature of 60 to 67° C. to effect precipitation of a purified fraction of said cellulose acetate amounting to 70 to 80% by weight of the original cellulose acetate present therein and separating said purified fraction from the supernatant liquid.

MERVIN E. MARTIN.
LAURENCE G. REED.
JAMES L. THOMAS.

REFERENCES CITED

The following references are of record in the file of this patent:

UNITED STATES PATENTS

| Number | Name | Date |
|---|---|---|
| 2,024,666 | Staud et al. | Dec. 17, 1935 |
| 2,045,628 | Alfthan | June 30, 1936 |
| 2,362,182 | Baker | Nov. 7, 1944 |

FOREIGN PATENTS

| Number | Country | Date |
|---|---|---|
| 444,935 | Great Britain | Mar. 31, 1936 |

OTHER REFERENCES

Journal Am. Chem. Soc. 1929, pp. 3095–3101, incl.

Sookne et al., J. Research Nat'l. Bur. Standards, V. 29, pages 123 to 130 (1942), 8 pages.